(12) United States Patent
McCune

(10) Patent No.: US 7,707,035 B2
(45) Date of Patent: Apr. 27, 2010

(54) AUTONOMOUS INTEGRATED HEADSET AND SOUND PROCESSING SYSTEM FOR TACTICAL APPLICATIONS

(75) Inventor: Timothy S. McCune, Arlington, VA (US)

(73) Assignee: Integrated Wave Technologies, Inc., Fremont, CA (US)

( * ) Notice: Subject to any disclaimer, the term of this patent is extended or adjusted under 35 U.S.C. 154(b) by 1045 days.

(21) Appl. No.: 11/251,350

(22) Filed: Oct. 13, 2005

(65) Prior Publication Data

US 2007/0100637 A1    May 3, 2007

(51) Int. Cl.
- G10L 21/00    (2006.01)
- G10L 21/02    (2006.01)
- G10L 15/20    (2006.01)
- G06F 17/28    (2006.01)
- H04M 1/00    (2006.01)
- H04M 1/60    (2006.01)

(52) U.S. Cl. .......................... 704/270; 704/2; 704/226; 704/227; 704/228; 704/233; 704/275; 704/277; 455/569.1; 379/174

(58) Field of Classification Search ................. 704/233
See application file for complete search history.

(56) References Cited

U.S. PATENT DOCUMENTS 5,818,381 A * 10/1998 Williams ..................... 342/24
5,995,936 A * 11/1999 Brais et al. .................. 704/275
6,457,024 B1 * 9/2002 Felsentein et al. ........... 707/206
2003/0115059 A1 * 6/2003 Jayaratne .................... 704/235
2005/0071166 A1 * 3/2005 Comerford et al. .......... 704/272
2006/0153394 A1 * 7/2006 Beasley ....................... 381/57
2006/0167687 A1 * 7/2006 Kates .......................... 704/235
2008/0004872 A1 * 1/2008 Nordholm et al. ........... 704/226

* cited by examiner

Primary Examiner—Matthew J Sked
(74) Attorney, Agent, or Firm—Beyer Law Group LLP (57)    ABSTRACT

A sound processing system including a user headset for use in tactical military operations provides integrated sound and speech analysis including sound filtering and amplification, sound analysis and speech recognition for analyzing speech and non-speech sounds and taking programmed actions based on the analysis, recognizing language of speech for purposes of one-way and two-way voice translation, word spotting to detect and identify elements of conversation, and non-speech recognition and identification. The headset includes housings with form factors for insulating a user's ear from direct exposure to ambient sounds with at least one microphone for receiving sound around the user, and a microphone for receiving user speech. The user headset can further include interconnections for connecting the headset with out systems outside of the headset, including target designation systems, communication networks, and radio transmitters.

5 Claims, 7 Drawing Sheets

Question/Response Architecture

AUTONOMOUS INTEGRATED HEADSET AND SOUND PROCESSING SYSTEM FOR TACTICAL APPLICATIONS

BACKGROUND OF THE INVENTION

This invention relates generally to sound processing and analysis systems, and more particularly the invention relates to an autonomous integrated headset communications, data processing, and sound analysis system suitable for military tactical use.

In military operations, participants are required to provide communication and control functions in environments having many external sounds and light stimuli and with other participants who may speak different languages. The level of success in implementing these functions depends in large part on the availability and ease of use of a supporting light, data, and sound processing system.

The present invention is directed to such a system.

SUMMARY OF THE INVENTION

In accordance with the invention, a sound processing system and headset support a user at performing communication and control functions autonomously and separately from a connection to a network or computer, as well as providing the user with a speech, speech recognition and sound analysis input capability to a network, computer and/or other headset users and two-way audio communication.

All system capabilities, with the exception of use of communications channels/networks, work on a stand alone basis and exist in the absence of external communications and/or computing resources. The system is also capable of functioning as a sound analysis sensor/node connected to a network.

In a preferred embodiment, the headset first of all has a form factor capable of insulating the user's ears from direct exposure to ambient sound and supporting integral hardware and with cables and connectors as required to interface with target designation systems, radio transmitters, and other communications equipment.

In a preferred embodiment, the system includes:

an outwardly aimed microphone for the purposes of hearing sound around the user;

a boom or other microphone for the purpose of user speech input for voice-to-voice translation, communications/control by speech recognition and communications over radio or other channels;

a filtering/amplification system comprising hardware/software sound filter elements and an analog/digital converter to convert sound around the user and sounds spoken by the user into computer input;

speakers in the headset to play for the user sound produced by the filtering/amplification system, as well as sound produced by the integrated computer: and speakers on the outside of the headset to play sound for other persons, including translated phrases that are part of the one-way and two-way voice-to-voice translation function.

In a preferred embodiment, the system further includes a light sensor to provide specific frequency and intensity data; and helmet-mounted cameras.

In another preferred embodiment, the headset includes a miniature data processing system to integrate system components, perform sound/speech recognition, execute user commands/control input; provide feedback to the user based upon system operations or input provided through a communication channel. Further, a sound analysis/speech recognition software system analyzes speech and non-speech sounds and takes programmed action based upon this analysis. Software/hardware recognizes English or other language speech spoken by the users for the purpose of one-way or two-way voice-to-voice translation, and software/hardware to recognize English or other language speech spoken to the user for the purpose of two-way voice-to-voice translation. Additionally, software/hardware is provided to recognize English or other language speech for the purpose of word spotting to detect and identify elements of conversation around the user; and to recognize vehicle or other sounds for the purpose of identifying the sources of the sounds to the user.

The invention and objects and features thereof will be more readily apparent from the following detailed description and appended claims when taken with the drawings.

DETAILED DESCRIPTION OF ILLUSTRATIVE EMBODIMENTS

Figure 1:
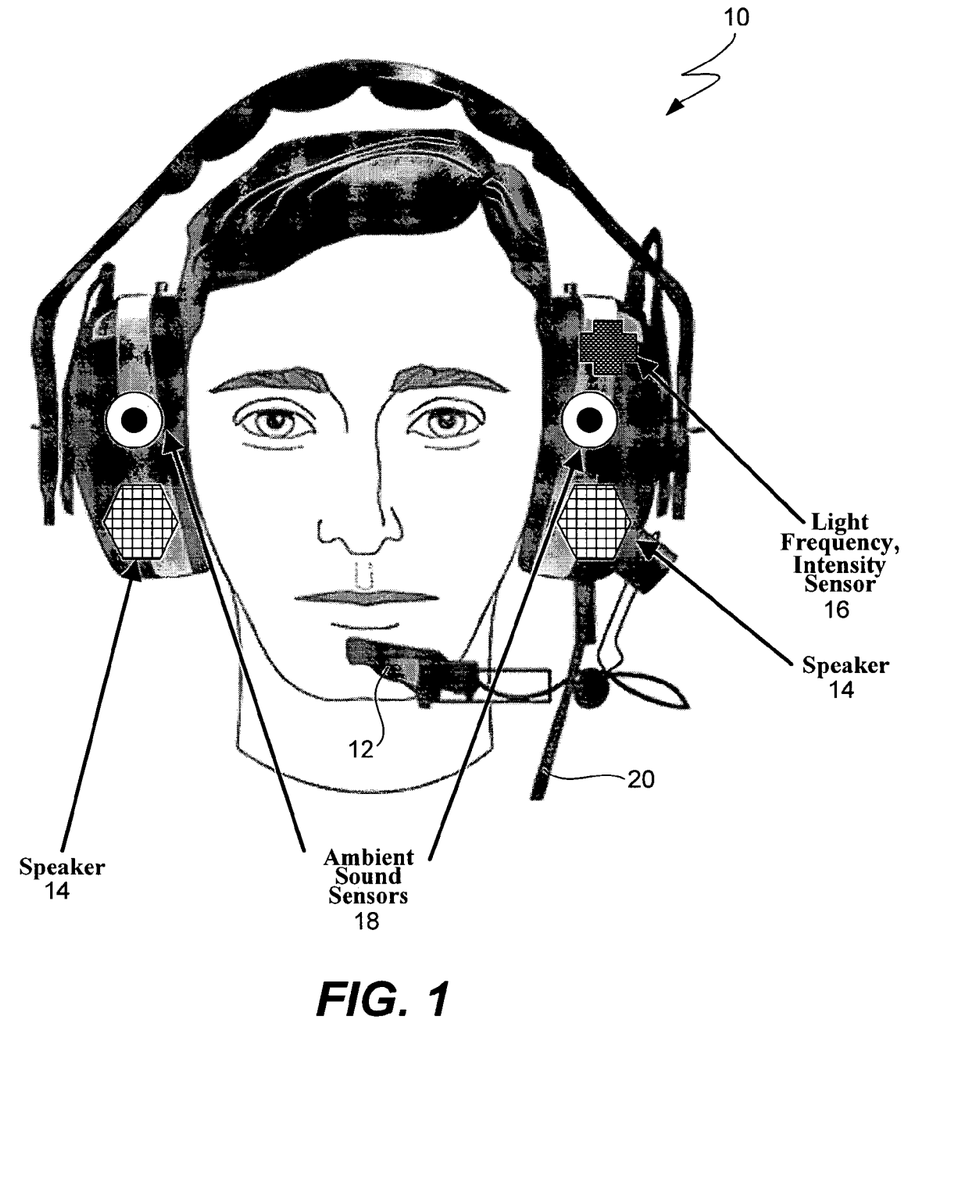
FIG. 1 illustrates a headset with integrated functions in accordance with the invention.

FIG. 1 illustrates a headset shown generally at 10 positioned on a user's ears to provide insulation from direct exposure to ambient sound. Microphone 12 provides for user speech input, while speakers in the headset provide sound to the user from a filtering/amplification system. Speakers 14 outside of the headset provide sound for others including translated phrases in the one-way and two-way voice-to-voice translation system. A light sensor 16 provides specific frequency and intensity data, and external microphones and sound sensors 18 pick up sounds around the user. Cables 20 provide interface with other devices including target designation systems, radio transmitters, and other communication devices. A central processing unit (CPU—FIG. 3) in the headset processes sound, light, and other input and recognizes speech inputs from users and persons with whom the user is interacting.

Figure 2:
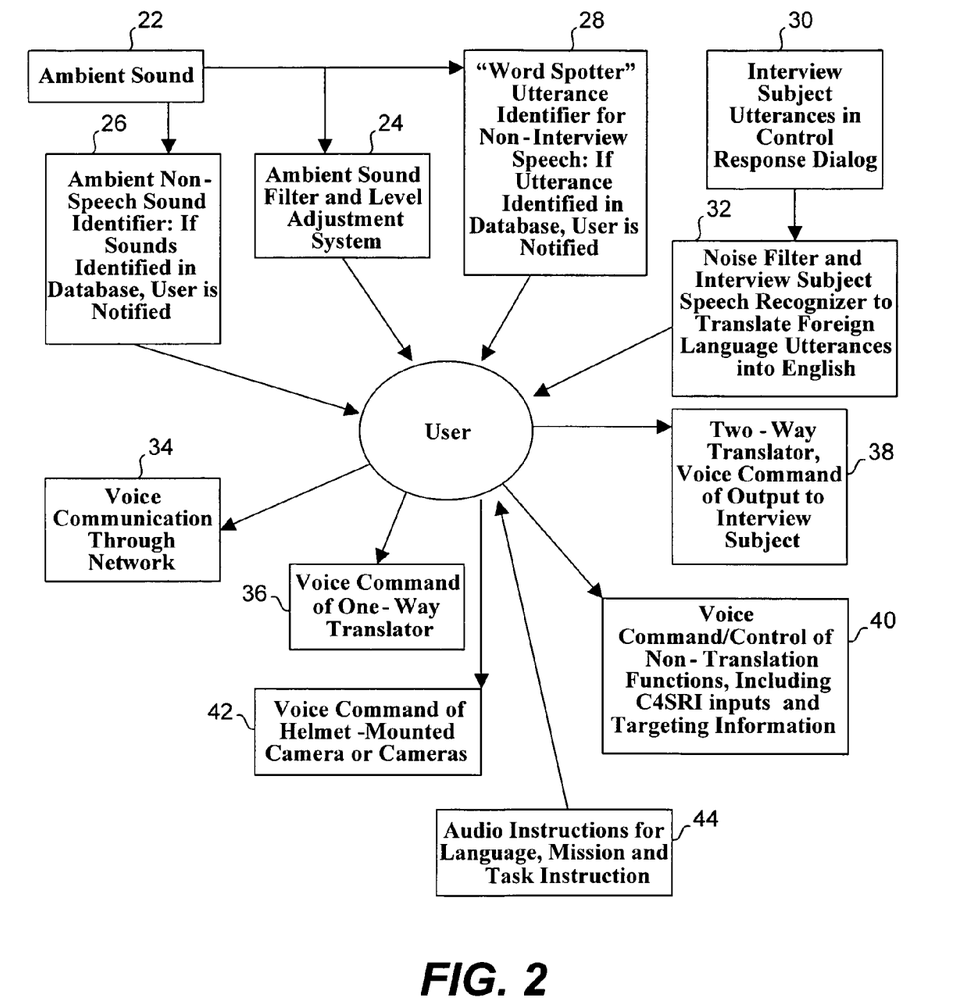
FIG. 2 illustrates the integrated functions in a preferred embodiment of the invention.

FIG. 2 illustrates integrated functions of the sound processing system. Ambient sound at 22 is provided through ambient sound filter and level adjustment system 24 to the user. Also, an ambient non-speech sound identifier 26 notifies a user if a sound is identified in a database, such as the sound of aircraft or other vehicles. A word spotter utterance identifier for non-interview speech at 28 notifies the user if an utterance is identified in a database. The sound is sorted by frequency range and then by fundamental characteristics to determine whether it is speech or non-speech, and then further identified based on frequency and other characteristics.

When a subject is to be interviewed, functional unit 30 passes utterances from the subject to a noise filter and interview subject speech recognizer 32 to translate foreign language utterances into English, which are then applied to the user. This function is based on a system in continued developed by IWT. Words and phrases within the target domains are characterized by gathering sample utterances made of those words/phrases in the target languages by native speakers. Those samples are processed into template packages that allow for fast analysis.

The user can respond to any of these function units or otherwise provide voice communication through an external network at 34, a voice command for one-way translator 36, a two-way translator and voice command of output to the interview subject at 38, a voice command/control of non-translation functions, including C4SRI inputs and targeting information at 40. Additionally, voice command of helmet-mounted camera or cameras is provided at 42. The user can receive audio instructions for language, mission and task instruction at 44. Integration of these multiple functions provides new user capabilities.

Figure 3:
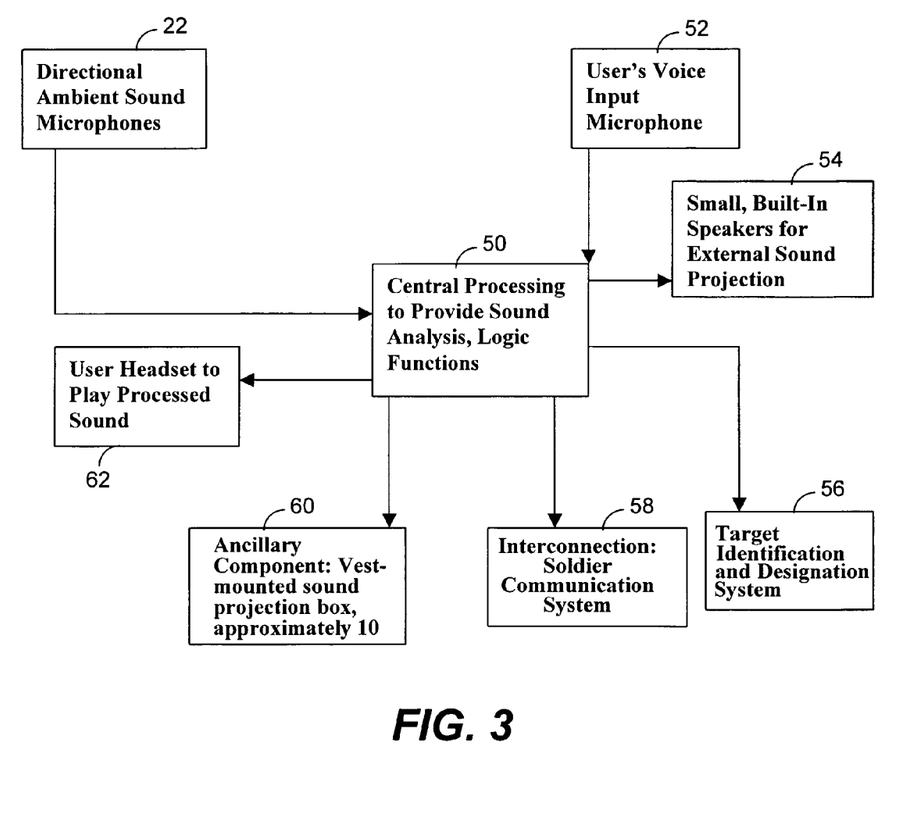
FIG. 3 illustrates components of the sound processing system of FIGS. 1, 2.

FIG. 3 is a functional block diagram showing more details of system components for the ambient sounds and user's voice input of the system of FIG. 2. A central processing unit 50 receives inputs from directional ambient microphones 22 and user's voice input microphone 52, and after processing the input sounds, provides outputs to built in speakers for external sound projection 54, target identification and designation system 56, interconnection with solider communication system 58, vest mounted sound projection box 60, and the user headset to play processed sounds at 62. Thus, the headset integrates exterior microphones in addition to the traditional small speakers in each ear enclosure.

Figure 4:
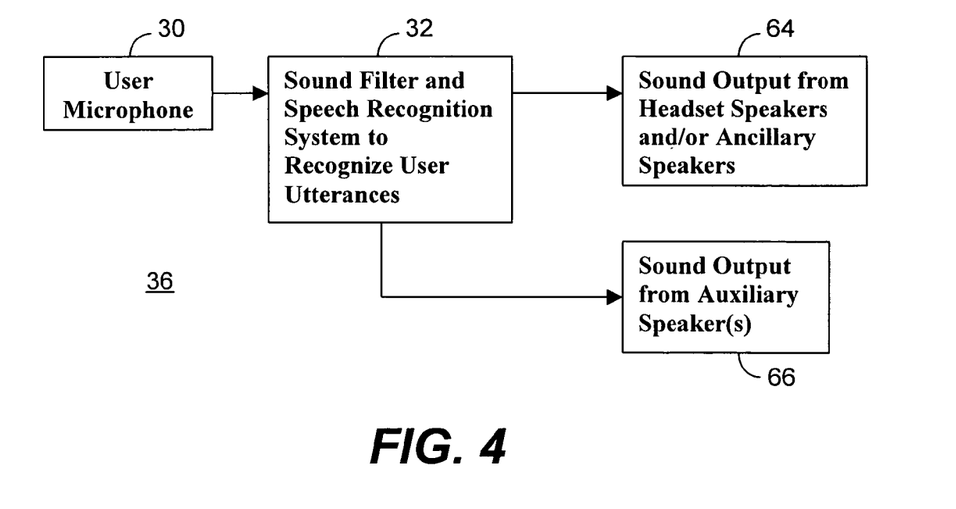
FIG. 4 illustrates one-way voice-to-voice translator functions of FIG. 2.

FIG. 4 is block diagram of one-way voice-to-voice translator function 36 of FIG. 2. The translation function is initiated by user voice command with the system operating by providing the user with domains of input and output words and phrases. The user activates the system function by voice command and then issues foreign language output phrases by issuing voice commands through the boom microphone. Here, the user boom microphone 30 provides sound inputs to sound filter and speech recognition unit 32 which recognizes user utterances and then provides outputs to the headset speakers and/or auxiliary speakers at 64 and to sound output from auxiliary speakers 66. Translation is initiated by user voice command. The system operates by providing the user with domains of input and output words and phrases. The user activates the system function by voice command and then issues foreign language output phrases by issuing voice commands through the boom microphone. Ambient noise conditions for the overall system operation require the use of advanced sound filtering.

Figure 5:
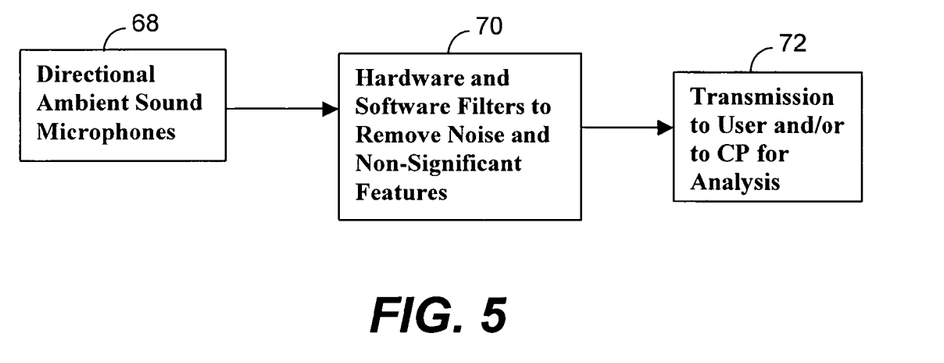
FIG. 5 illustrates a flowchart of ambient noise processing functions of FIG. 2.

FIG. 5 is a block diagram of the ambient noise input system function. Here, directional ambient sound microphones 68 provide inputs to hardware and software filters to remove noise and non-significant features at 70. The filtered output is then transmitted to the user and to central processing for analysis at 72. The system receives audio inputs through one or more microphones set to receive ambient sound. Non-significant noise and features are removed through hardware and software filters.

Figure 6:
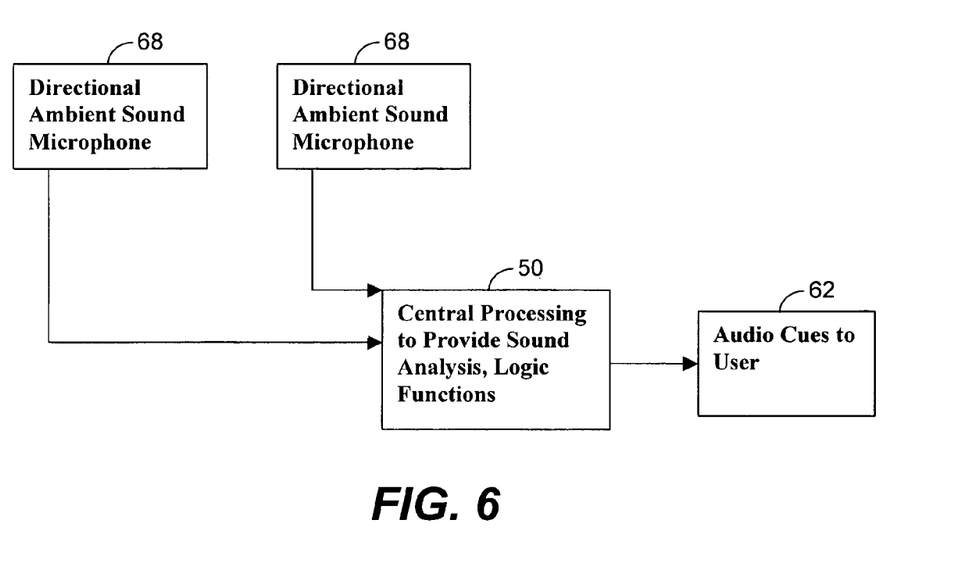
FIG. 6 illustrates a flowchart of ambient noise identification functions of FIG. 2.

FIG. 6 is a flow diagram of the ambient noise identification function 26 of FIG. 2. The directional ambient sound microphones 68 provide inputs to the central processing unit 50 which then provides audio cues to the user at 62. In operation, the system receives ambient sound input from the headset's built in directional microphones, and this sound it filtered, digitized and re-filtered before being sent to the central processing function. The central processing function then implements sound recognition algorithms to analyze and identify ambient sound. As sounds are identified, the central processor command specific audio cues are played through the headset so the user will be informed of the identification.

Figure 7:
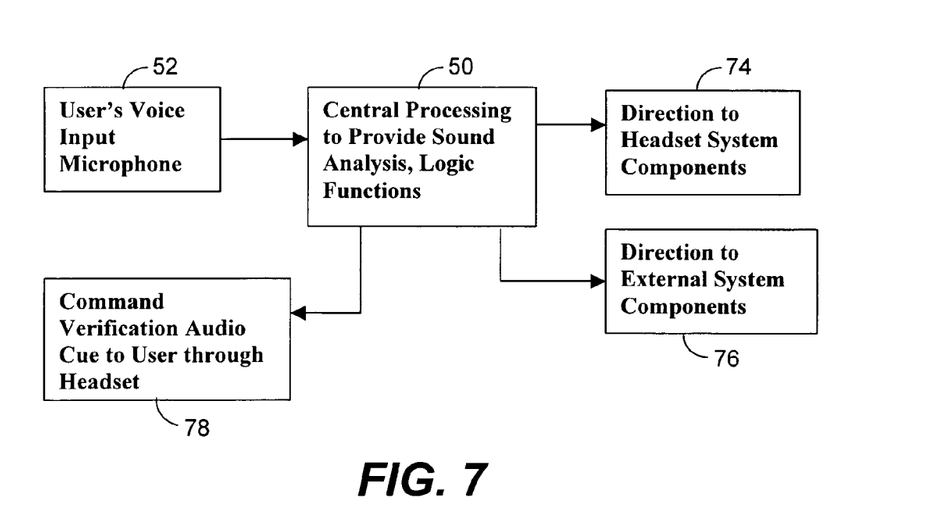
FIG. 7 illustrates a flowchart of voice control commands/control function of FIG. 2.

FIG. 7 illustrates the voice control command/control function shown at 40 in FIG. 2. The user's input microphone 52 directs the voice commands to central processing unit 50, which then issues command/control signals to the headset system components at 74, and to external system components at 76. A command verification audio cue is sent to the user through the headset at 78. This system function provides the user with voice command capability for varied requirements. The user engages and disengages the various functions in the system by voice command, and the user can issue voice commands that send a signal over the command/control network for expanded functions, such as to provide audio status of dates of mission information.

Figure 8:
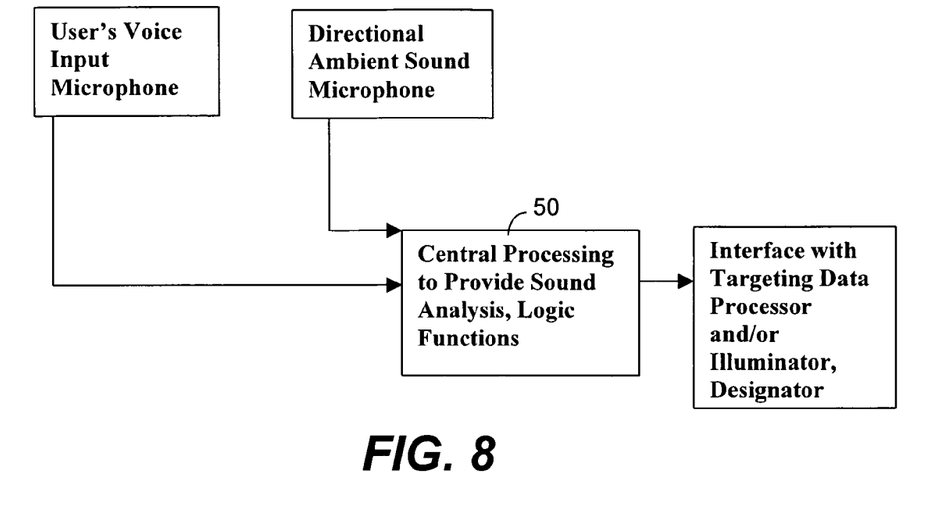
FIG. 8 illustrates a target identification and designation system of FIG. 2.

FIG. 8 is a functional block diagram of target identification and designation function, which provides for more effective target acquisition by allowing the user to input targeting information in an eyes-free, hands-free manner. This can include identifying weapons systems near the user through ambient sound analysis. The combined capabilities of target identification, integration with target designation devices, and voice command of targeting provide the user with a more effective basis for providing information on these targets to supporting forces. The user can identify and select a target, either using his own senses alone or assisted by the system's sound identification capability. The user then enters critical data using voice commands. A target designator/illuminator, such as a laser designator, is engaged by voice or hand command. Location and identification is then sent to command/control network to support engagement of other forces.

Figure 9:
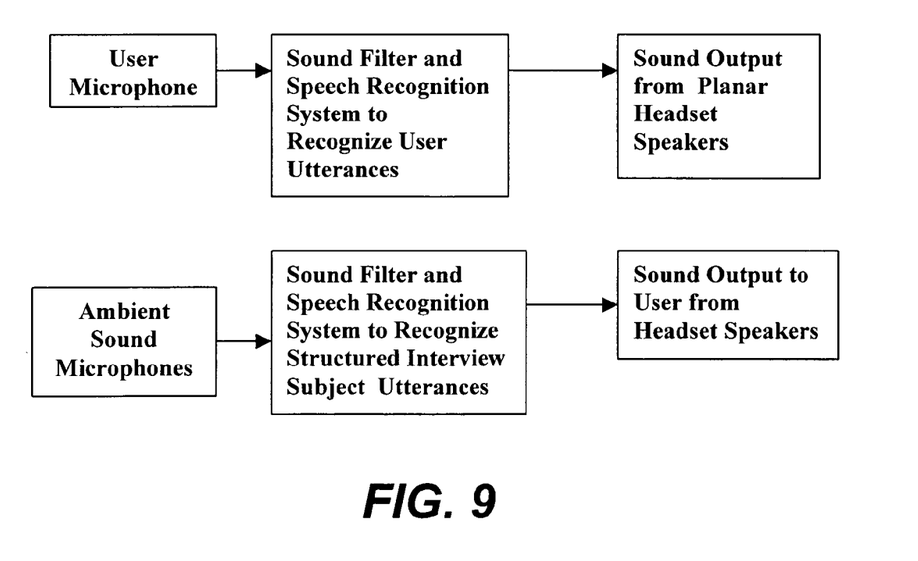
FIG. 9 illustrates a two-way voice-to-voice translator function of FIG. 2.

FIG. 9 is a functional block diagram of two-way voice-to-voice translator function shown at 38 in FIG. 2. The two-way translator function is initiated by user voice command, and once this function is activated the user can then use voice commands to begin two-way translation sequences as shown. The user instructs interview subjects to elicit specific responses to meet information requirements. Further, the system filters ambient noise to receive foreign language interview subject responses. The system then identifies within total sounds received, utterances that match word/phrases with in the expected response domain. Identified responses are then translated into English and played for the user. Through this structure, the user is able to control and direct a useful two-way conversation with the interview subject.

Figure 10:
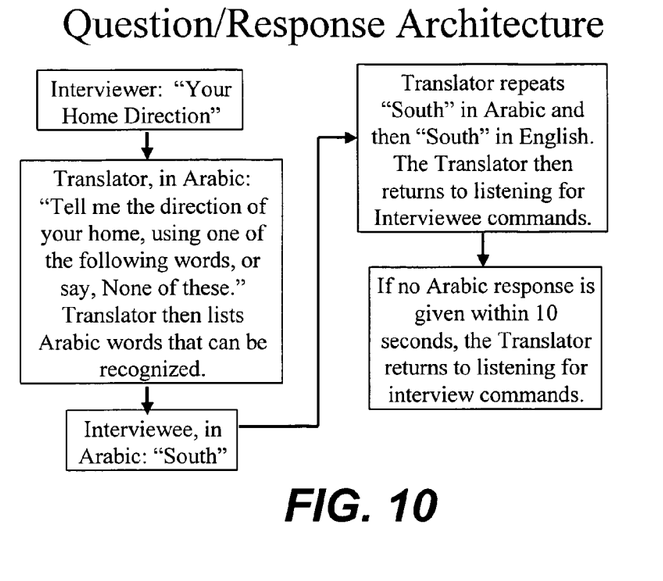
FIG. 10 illustrates a question/response architecture for two-way translator of FIG. 2.

FIG. 10 illustrates question/response architecture for two-way translation and shows the process for conducting controlled response two-way voice-to-voice translation.

Figure 11:
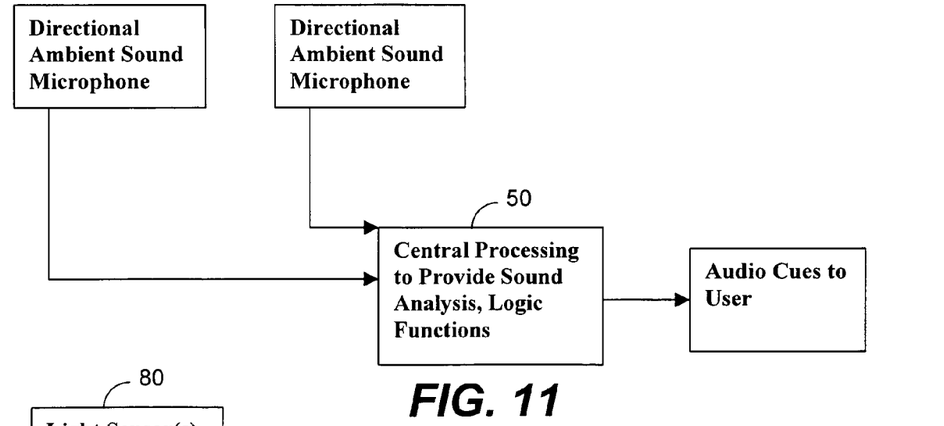
FIG. 11 illustrates a word spotting function of FIG. 2.

FIG. 11 is a functional diagram of the word spotting function. Here, the system receives ambient sound input from the headset's built in directional microphones. This sound is filtered, digitized and re-filtered before being sent to the central processing function of the system. The central processing function then implements word spotting recognition algorithms to analyze and identify ambient sound. As target words are identified, the central processor will command specific audio cues to be played through the headset so that the user will be informed of the identification.

Figure 12:
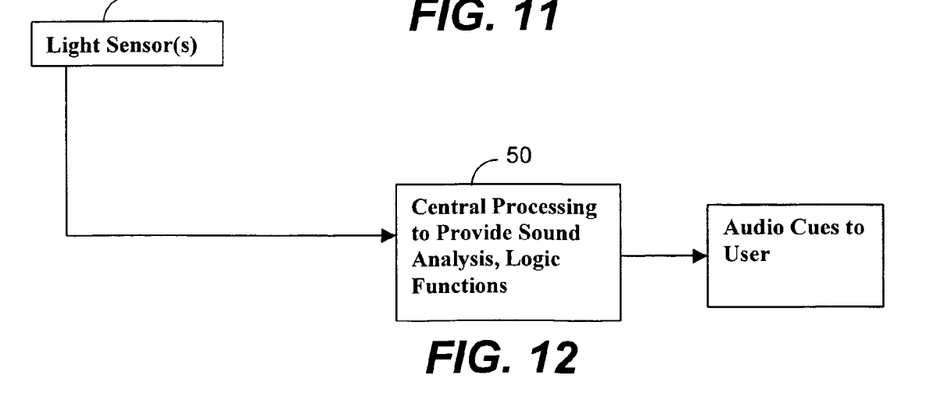
FIG. 12 illustrates a light identification function of FIG. 2.

FIG. 12 illustrates system components of the word processing function, including light sensors. The system receives ambient light input from the headset's built-in sensors 80, and the central processing function implements identification algorithms to analyze and identify ambient light. As target words are identified, the central processor prepares specific audio cues to be played through the headset so that user will be informed of the identification. The user can select from these audio cues of identified light to be played to him as they occur, or he can select that this information be played to him only if he requests an update by voice command. For example, in operation the system detects a light signature that indicates an explosion occurred. The system correlates this with sound received from the explosion to calculate the distance and inform the user by audio cue of the explosion and all calculated information. If the system is able to calculate direction in addition to distance, this information is provided as well.

In the instance of an audio input being received, the central processor will characterize the sound by frequency and fundamental characteristics. Sounds deemed to be possible speech utterances will be converted to template form and compared with relevant utterance templates stored in the system database. If a match is made by the processor, the information will be relayed to the user through the use of audio cues. Again, the central processor receives inputs indicating a relevant sound or light had been detected and analyze these inputs. Based on this analysis, the headset's internal speakers will play informational cues to the user and in some instances ask the user to provide inputs related to further analysis/action.

There has been described an autonomous integrated headset communications, data processing, and sounds analysis system for tactical applications. The headset provides speech recognition, noise filtering, and sound analysis and identification. One-way and two-way voice-to-voice translation is facilitated along with voice command of computer controlled functions and voice command of helmet mounted cameras. Computer generated audio cues are provided to the user, and optical and other sensors can be provided for situational awareness. In addition to autonomous operation, the headset can be connected to a network, computer and/or wireless links with other headsets as well as providing the user with speech, speech recognition, and sound analysis input.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A sound processing system for tactical military operations comprising:
   a) a headset including housings with form factors for insulating user ears from direct exposure to ambient sound,
   b) at least one microphone for receiving sounds around a user,
   c) a microphone for receiving user speech,
   d) a processing unit for processing sound from said microphones, the processing unit providing sound filtering and amplification, sound analysis and speech recognition for analyzing speech and non-speech sounds and taking programmed actions based on the analysis, recognizing language of speech for purposes of one-way and autonomous two-way voice-to-voice translation, word spotting to detect and identify elements of communication, and non-speech recognition and identification,
   e) speakers in the housings to play for a user sound produced by the processing units,
   f) at least one speaker on the outside of the headset to play sound for other persons including translated phrases in a first language of speech as part of one-way and two-way voice-to-voice communication, wherein the first language of speech is the same language of speech received by a microphone that receives sounds around a user and recognized by the processing unit,
   g) a light sensor for providing to the processing unit frequency and intensity of any impinging light,
   h) a variably positionable headset mounted camera, the processing unit providing instructions to the camera in response to voice commands from the user, and
   i) interconnections for connecting the user headset with other systems outside of the headset, wherein the other systems include target designation systems, communication networks, and radio transmitters.

2. The sound processing system of claim 1 wherein the processing unit further provides non-speech sound recognition including vehicle noise recognition.

3. A sound processing system for tactical military operations comprising:
   a) a headset including housings with form factors for insulating user ears from direct exposure to ambient sound,
   b) at least one microphone for receiving sounds around a user,
   c) a microphone for receiving user speech,
   d) a processing unit for processing sound from said microphones, the processing unit providing sound filtering and amplification, sound analysis and speech recognition for analyzing speech and non-speech sounds and taking programmed actions based on the analysis, recognizing language of speech for purposes of one-way and autonomous two-way voice-to-voice translation, word spotting to detect and identify elements of communication, and non-speech recognition and identification,
   e) speakers in the housings to play for a user sound produced by the processing unit,
   f) at least one speaker on the outside of the headset to play sound for other persons including translated phrases in a first language of speech as part of one-way and two-way voice-to-voice communication, wherein the first language of speech is the same language of speech received by a microphone that receives sounds around a user and recognized by the processing unit,
   g) a light sensor for providing to the processing unit frequency and intensity of any impinging light, and
   h) a system to correlate information received by the light sensor with information received by the microphones.

4. The sound processing system of claim 3 and further including:
   i) a system to calculate the distance between the user and a source of the sound and light signals received by the system by correlating the sound and light information.

5. The sound processing system of claim 3 and further including:
   i) a system to calculate the direction of a source of the sound and light signals received by the system with respect to the user by correlating the sound and light information.

* * * * *